US012574847B2

(12) United States Patent
Wu et al.

(10) Patent No.: US 12,574,847 B2
(45) Date of Patent: Mar. 10, 2026

(54) SIDELINK (SL) DISCONTINUOUS RECEPTION (DRX) FOR UNICAST, CONNECTION-SPECIFIC DRX

(71) Applicant: APPLE INC., Cupertino, CA (US)

(72) Inventors: Zhibin Wu, Cupertino, CA (US); Chunxuan Ye, San Diego, CA (US); Dawei Zhang, Cupertino, CA (US); Fangli Xu, Beijing (CN); Haijing Hu, Cupertino, CA (US); Haitong Sun, Cupertino, CA (US); Hong He, Cupertino, CA (US); Jie Cui, Cupertino, CA (US); Wei Zeng, Cupertino, CA (US); Yang Tang, Cupertino, CA (US); Yuqin Chen, Beijing (CN)

(73) Assignee: APPLE INC., Cupertino, CA (US)

(*) Notice: Subject to any disclaimer, the term of this patent is extended or adjusted under 35 U.S.C. 154(b) by 602 days.

(21) Appl. No.: 17/593,551

(22) PCT Filed: Oct. 22, 2020

(86) PCT No.: PCT/CN2020/122926
§ 371 (c)(1),
(2) Date: Sep. 20, 2021

(87) PCT Pub. No.: WO2022/082639
PCT Pub. Date: Apr. 28, 2022

(65) Prior Publication Data
US 2022/0312326 A1     Sep. 29, 2022

(51) Int. Cl.
H04W 52/02      (2009.01)
H04W 72/1263    (2023.01)
H04W 92/18      (2009.01)

(52) U.S. Cl.
CPC ... *H04W 52/0232* (2013.01); *H04W 72/1263* (2013.01); *H04W 92/18* (2013.01)

(58) Field of Classification Search
CPC ......... H04W 52/0232; H04W 72/1263; H04W 92/18; H04W 76/27; H04W 76/40; H04W 76/14; H04W 76/28; Y02D 30/70
See application file for complete search history.

(56) References Cited

U.S. PATENT DOCUMENTS

2016/0044740 A1    2/2016   Siomina et al.
2019/0174411 A1    6/2019   Xu et al.
(Continued)

FOREIGN PATENT DOCUMENTS

CN    107005866 A    8/2017
CN    108307486 A    7/2018
(Continued)

OTHER PUBLICATIONS

Intel Corporation et al., "DRX in sidelink", R2-167764, 3GPP TSG RAN WG2 Meeting #96, Reno, Nevada, Agenda Item 8.4.3.2, Nov. 14-18, 2016, 2 pages.
(Continued)

*Primary Examiner* — Pamit Kaur
(74) *Attorney, Agent, or Firm* — Dorsey & Whitney LLP

(57)     ABSTRACT

This disclosure provides details of a configuration signaling and associated behaviors for sidelink (SL) discontinuous reception (DRX) for unicast, connection-specific DRX. According to one embodiment, a first user equipment (L E) configures link-specific discontinuous reception (DRX) by processing a common DRX configuration that is preconfigured, received through a Uu interface, or received in a SIB; and signaling over a PCS interface with a second UE, a
(Continued)

link-specific configuration for a link-specific DRX cycle, the Link-specific configuration including a link-specific on-duration parameter.

18 Claims, 7 Drawing Sheets

(56)                    References Cited

U.S. PATENT DOCUMENTS

| | | | |
|---|---|---|---|
| 2020/0120482 A1 | 4/2020 | Parkvall et al. | |
| 2020/0280940 A1 | 9/2020 | Kim et al. | |
| 2021/0037468 A1* | 2/2021 | Huang | H04W 76/14 |
| 2022/0304103 A1* | 9/2022 | Cheng | H04W 76/14 |
| 2023/0014303 A1* | 1/2023 | Di Girolamo | H04W 72/20 |
| 2023/0199905 A1* | 6/2023 | Liang | H04W 52/0235 |
| | | | 455/574 |
| 2023/0247620 A1* | 8/2023 | Seo | H04W 52/02 |
| | | | 370/329 |
| 2023/0284136 A1* | 9/2023 | Ganesan | H04W 76/28 |
| | | | 370/311 |
| 2023/0284332 A1* | 9/2023 | Zhang | H04W 76/14 |
| | | | 370/328 |
| 2023/0328840 A1* | 10/2023 | Cheng | H04W 76/28 |
| | | | 370/329 |

FOREIGN PATENT DOCUMENTS

| | | |
|---|---|---|
| CN | 109565702 A | 4/2019 |
| CN | 111405610 A | 7/2020 |
| CN | 111480391 A | 7/2020 |
| CN | 111556590 A | 8/2020 |
| EP | 4120756 A1 | 1/2023 |
| WO | 2017196611 A1 | 11/2017 |

OTHER PUBLICATIONS

WIPO, International Search Report and Written Opinion, PCT/CN2020/122926, Jul. 2, 2021, 9 pages.

Huawei, Hisilicon, "KI#1, New Sol: negotiate a PC5 DRX for Unicast communication", S2-2005400 (revision of S2-200xxxx), 3GPP TSG-WG SA2 Meeting #140E e-meeting, Elbonia, Agenda Item 8.12, Aug. 19-Sep. 1, 2020, 4 pages.

Nokia, Nokia Shanghai Bell, "KI#1, Sol#2: Update to clarify PC5 DRX pattern information, PC5 DRX activation and deactivation, and AS-layer PC5 DRX adjustments", R2-2007597, SA WG2 Meeting #141e, Elbonia, Agenda Item 8.12, Oct. 12-23, 2020, 4 pages.

Tencent, "KI #1, Sol #2: Update to clarify application requirements and traffic pattern", S2-2007201, SA WG2 Meeting #141E (e-meeting), Elbonia, Agenda Item 8.12, Oct. 12-23, 2020, 5 pages.

Tencent, "KI #1, Sol #5: Update for procedure clarification and alignment", S2-2007200, SA WG2 Meeting #141E (e-meeting) Elbonia, Agenda Item 8.12, Oct. 12-23, 2020, 5 pages.

Zte, Sanechips, "Potential impact of DRX enhancement to RAN1 discussion", R1-2005962, 3GPP TSG RAN WG1 #102-e, e-Meeting, Agenda Item 8.11.3, Aug. 17-28, 2020, 2 pages.

* cited by examiner

SIDELINK (SL) DISCONTINUOUS RECEPTION (DRX) FOR UNICAST, CONNECTION-SPECIFIC DRX

TECHNICAL FIELD

This application relates generally to wireless communication systems, including sidelink for user equipment (UE) to UE communication.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
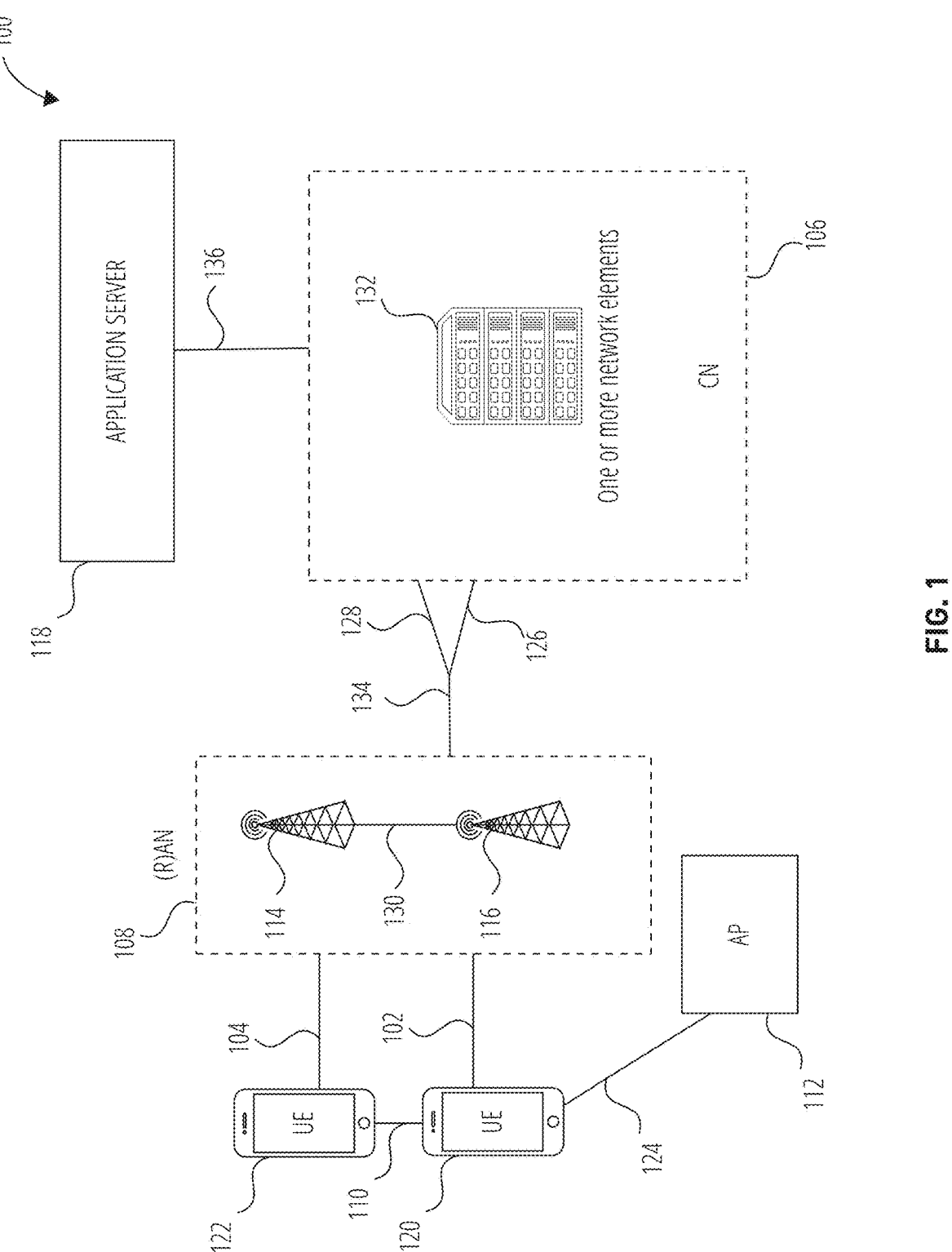
FIG. 1 is a block diagram of a system for wireless communications, in accordance with one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 122 and UE 120. In this example, the UE 122 and the UE 120 are illustrated as smartphones (e.g., handheld touchscreen mobile computing devices connectable to one or more cellular networks), but may also comprise any, mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the LIE 122 and/or the UE 120 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 122 and UE 120 may be configured to connect, for example, communicatively couple, with an access node or radio access node (shown as (R)AN 108), In embodiments, the (R)AN 108 may be an NG RAN or a SG RAN, an E-UTRAN, or a legacy RAN, such as a UTRAN or GERAN. As used herein, the term "NG RAN" or the like may refer to a (R)AN 108 that operates in an NR or SG system, and the term "E-UTRAN" or the like may refer to a (R)AN 108 that operates in an LTE or 4G system. The UE 122 and UE 120 utilize connections (or channels) (shown as connection 104 and connection 102, respectively), each of which comprises a physical communications interface or layer (discussed in further detail below).

In this example, the connection 104 and connection 102 are air interfaces to enable communicative coupling, and can be consistent with cellular communications protocols, such as a GSM protocol, a CDMA network protocol, a PTT protocol, a POC protocol, a UMTS protocol, a 3GPP LIE protocol, a SG protocol, a NR protocol, and/or any of the other communications protocols discussed herein. In embodiments, the UE 122 and UE 120 may, directly exchange communication data via a ProSe interface 110. The ProSe interface 110 may alternatively be referred to as a sidelink (SL) interface 110 and may comprise one or more logical channels, including but not limited to a PSCCH, a PSSCH, a PSDCH, and a PSBCH.

The UE 120 is shown to be configured to access an AP 112 (also referred to as "WLAN node," "WLAN," "WLAN Termination," "WT" or the like) via connection 124. The connection 124 can comprise a local wireless connection, such as a connection consistent with any IEEE 802.11 protocol, wherein the AP 112 would comprise a wireless fidelity (Wi-Fi®) router. In this example, the AP 112 may be connected to the Internet without connecting to the core network of the wireless system (described in further detail below). In various embodiments, the UE 120, (R)AN 108, and AP 112 may be configured to utilize LWA operation and/or LWIP operation. The LWA operation may involve the UE 120 in RRC_CONNECTED being configured by the RAN node 114 or the RAN node 116 to utilize radio resources of LTE and WLAN. LWIP operation may involve the UE 120 using WLAN radio resources (e.g., connection 124) via IPsec protocol tunneling to authenticate and encrypt packets (e.g., IP packets) sent over the connection 124. IPsec tunneling may include encapsulating the entirety of original IP packets and adding a new packet header, thereby protecting the original header of the IP packets.

The (R)AN 108 can include one or more AN nodes, such as RAN node 114 and RAN node 116, that enable the connection 104 and connection 102. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 100 (e.g., an eNB). According to various embodiments, the RAN node 114 or RAN node 116 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 114 or RAN node 116 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 114 or RAN node 116); a MAC/PHY split wherein RRC, PDCP, RLC, and MAC layers are operated by the CRAN/vBBUP and the PHY layer is operated by individual RAN nodes (e.g., RAN node 114 or RAN node 116); or a "lower PHY" split wherein RRC, PDCP, RLC, MAC layers and upper portions of the PITY layer are operated by the CRAN/vBBUP and lower portions of the PHY layer are operated by individual RAN nodes. This virtualized framework allows the freed-up processor cores of the RAN node 114 or RAN node 116 to perform other virtualized applications. In some implementations, an individual RAN node may represent individual gNB-DUs that are connected to a gNB-CU via individual F1 interfaces (not shown by FIG. 1). In these implementations, the gNB-DUs may include one or more remote radio heads or RFEMs, and the gNB-CU may be operated by a server that is located in the (R)AN 108 (not shown) or by a server pool in a similar manner as the CRAN/vBBUP. Additionally, or alternatively, one or more of the RAN node 114 or RAN node 116 may be next generation eNBs (ng-eNBs), which are RAN nodes that provide E-UTRA user plane and control plane protocol terminations toward the UE 122 and UE 120, and are connected to an SGC via an NG interface (discussed infra). In V2X scenarios one or more of the RAN node 114 or RAN node 116 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 114 and/or the RAN node 116 can terminate the air interface protocol and can be the first point of contact for the LIE 122 and UE 120. In some embodiments, the RAN node 114 and/or the RAN node 116 can fulfill various logical functions for the (R)AN 108 including, but not limited to, radio network controller (RNC) functions such as radio bearer management, uplink and downlink dynamic radio resource management and data packet scheduling, and mobility management.

In embodiments, the UE 122 and UE 120 can be configured to communicate using OFDM communication signals with each other or with the RAN node 114 and/or the RAN node 116 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 114 and/or the RAN node 116 to the UE 122 and UE 120, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 122 and UE 120 and the RAN node 114 and/or the RAN node 116 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 122 and UE 120 and the RAN node 114 or RAN node 116 may operate using LAA, eLAA, and/or feLAA mechanisms. In these implementations, the UE 122 and UE 120 and the RAN node 114 or RAN node 116 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 122 and UE 120, RAN node 114 or RAN node 116, etc.)

senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 122, AP 112, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds ($\mu$s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 122 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 122 and UE 120. The PDCCH carries information about the transport format and resource allocations related to the PDSCH channel, among other things. It may also inform the UE 122 and UE 120 about the transport format, resource allocation, and HARQ information related to the uplink shared channel. Typically, downlink scheduling (assigning control and shared channel resource blocks to the UE 120 within a cell) may be performed at any of the RAN node 114 or RAN node 116 based on channel quality information fed back from any of the UE 122 and UE 120. The downlink resource assignment information may be sent on the PDCCH used for (e.g., assigned to) each of the UE 122 and UE 120.

The PDCCH uses CCEs to convey the control information. Before being mapped to resource elements, the PDCCH complex-valued symbols may first be organized into quadruplets, which may then be permuted using a sub-block interleaves for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 114 or RAN node 116 may be configured to communicate with one another via interface 130. In embodiments where the system 100 is an LTE system (e.g., when CN 106 is an EPC), the interface 130 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 122 from an SeNB for user data; information of PDCP PDUs that were not delivered to a UE 122; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a SG or NR system (e.g., when CN 106 is an SGC), the interface 130 may be an Xn interface. The Xn interface is defined between two or more RAN nodes (e.g., two or more gNBs and the like) that connect to SG-C, between a RAN node 114 (e.g., a gNB) connecting to SGC and an eNB, and/or between two eNBs connecting to 5GC (e.g., CN 106). In some implementations; the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 122 in a connected mode (e.g., CM-CONNECTED) including functionality to manage the UE mobility for connected mode between one or more RAN node 114 or RAN node 116. The mobility support may include context transfer from an old (source) serving RAN node 114 to new (target) serving RAN node 116; and control of user plane tunnels between old (source) serving RAN node 114 to new (target) serving RAN node 116. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In oilier implementations, the Xn protocol stack and/or the Xn-C protocol stack may be same or similar to the user plane and/or control plane protocol stack(s) shown and described herein.

The (R)AN 108 is shown to be communicatively coupled to a core network-in this embodiment, CN 106. The CN 106 may comprise one or more network elements 132, which are configured to offer various data and telecommunications services to customers/subscribers (e.g., users of UE 122 and UE 120) who are connected to the CN 106 via the (R)AN 108. The components of the CN 106 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 106 may be referred to as a network slice, and a logical instantiation of a portion of the CN 106 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 118 may be an element offering applications that use IP bearer resources with the core network (e.g., UNITS PS domain, LTE PS data services, etc.). The application server 118 can also be configured to support one or more communication services (e.g., VoIP sessions, PTT sessions, group communication sessions, social networking services, etc.) for the UE 122 and UE 120 via the EPC. The application server 118 may communicate with the CN 106 through an IP communications interface 136.

In embodiments, the CN 106 may be an SGC, and the (R)AN 116 may be connected with the CN 106 via an NG interface 134. In embodiments, the NG interface 134 may be split into two parts, an NG user plane (NG-U) interface 126, which carries traffic data between the RAN node 114 or RAN node 116 and a UPF, and the S1 control plane (NG-C) interface 128, which is a signaling interface between the RAN node 114 or RAN node 116 and Access and Mobility Management Functions (AMFs).

In embodiments, the CN 106 may be a SG CN, while in other embodiments, the CN 106 may be an EPC). Where CN 106 is an EPC, the (R)AN 116 may be connected with the CN 106 via an S1 interface 134. In embodiments, the S1 interface 134 may be split into two parts, an S1 user plane (S1-U) interface 126, which carries traffic data between the RAN node 114 or RAN node 116 and the S-GW, and the S1-MME interface 128, which is a signaling interface between the RAN node 114 or RAN node 116 and MMEs.

Figures 2, 3:
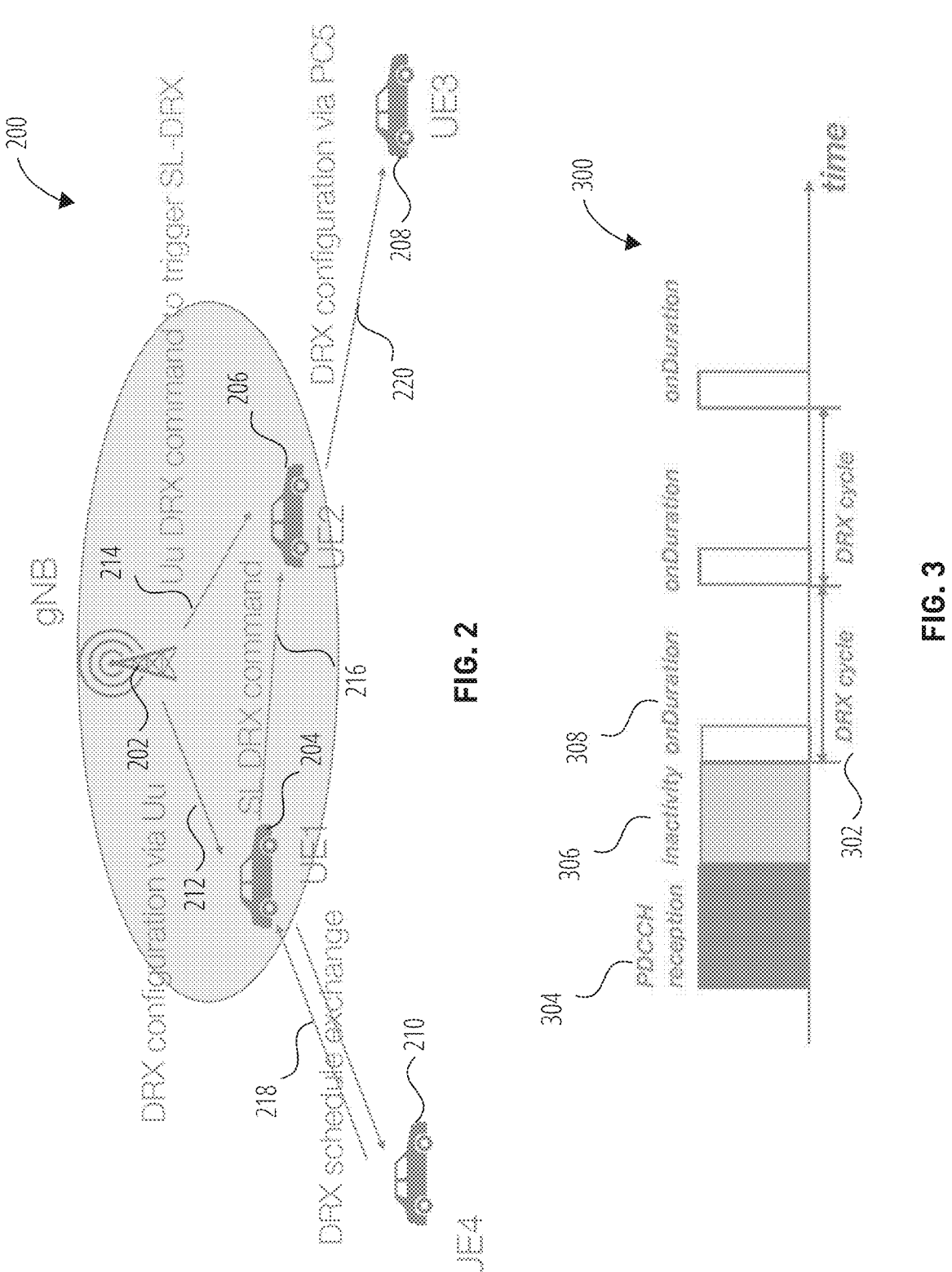
FIG. 2 is an annotated block diagram of a system for wireless communications, in accordance with one embodiment.
FIG. 3 is an annotated timing diagram, in accordance with one embodiment.

DRX for SL broadcast and unicast may use different schemes, FIG. 2 shows a wireless communications system 200 implementing a SL-DRX design for unicast-specific DRX. Wireless communications system 200 includes a gNB 202 communicatively coupled with a first UE 204 and a second UE 206. Second UE 206 is communicatively coupled to a third UE 208. First UE 204 is communicatively coupled to a fourth UE 210. In the present examples, the UEs are shown as vehicles because SL is commonly employed for Vehicle-to-Vehicle (V2V), which is a type of Vehicle-to-Everything (V2X) communication.

SL-DRX involves both Uu and PC5 interfaces. For example, a DRX configuration via Uu 212 is established between gNB 202 and first UE 204 by RRC layer-3 signaling. A Uu DRX command to trigger SL-DRX 214 in the form of MAC layer-2 signaling is provided from gNB 202 to second UE 206. An SL-DRX command 216 (also MAC layer-2 signaling) is provided from first UE 204 to second UE 206. A DRX schedule exchange 218 is made between first UE 204 and fourth UE 210. A DRX configuration via PC5 220 is also established between second. UE 206 and third UE 208 by RRC layer-3 signaling.

There are two types of DRX process that can be used in either RRC-Idle or RRC-Connected state. When DRX is used in Idle state it is called Idle mode DRX and when used in Connected state it is called Connected mode DRX (C-DRX).

Idle mode DRX is used for Paging DRX cycle. Each UE listens to its periodic paging occasion (PO) that is calculated based on UE ID.

C-DRX includes two types: a Short DRX cycle and a Long DRX cycle. C-DRX can be triggered as follows: if there is no activity during "inactivityTimer" plus "onDuration;" or the UE receives a DRX MAC control element (CE) and is instructed to enter DRX mode.

There are several RRC parameters for C-DRX configuration (as in NR Uu). The following list includes an example of the parameters: drx-inactivityTimer; drx-onDuration-Timer; drx-slotOffset; drx-ShortCycle; drx-ShortCycleTimer; drx-RetransmissionTimerUL; drx-RetransmissionTimerDL; drx-HARQ-RTT-TimerDL; drx-HARQ-RTT-TimerUL; and drx-LongCycleStartOffset (includes both the long cycle length and the start offset). These parameters are enhanced to specify similar functionality for sidelinks For example, the new parameters may include a prefix "sl- . . . ," "sidelink- . . . " or similar notation.

FIG. 3 shows an example timing diagram 300 and configuring a DRX cycle 302. Initially, PDCCH reception 304 provides the aforementioned RRC parameters, After an inactivity period 306, DRX cycle 302 begins with an onDuration 308, which is followed by an off period. Subsequent DRX cycles are then performed.

To mimic the design of NR Uu C-DRX and leverage it for the PC5 interface, SL-DRX could be operated as a per unicast connection. For example, similar timer configurations as those listed above made be implemented but with prefixes for the sidelink. For example, SL-DRX designs, which are similar to Uu C-DRX, may be configured as follows. The DRX configuration could be configured via PC5-RRC messages (as part of mac-config for SL unicast), comprising a new information element (IE). SL-DRX timers are maintained per SL unicast connection. An SL-DRX command (SL MAC CE) enables the DRX cycle per connection. The DRX triggers include self-trigger (inactivity timer expiry) or peer-trigger (with SL-DRX command). SL-DRX designs are also similar to Uu C-DRX in an asymmetric scenario in which one of the UEs is always ON (e.g., a car that has a constant source of power), so there is never DRX for the always-on UE (similar to a gNB in DRX). Furthermore, short and long DRX cycles can be configured in SL-DRX designs.

There are also differences between SL-DRX designs and Uu C-DRX. For example, in the symmetric scenario, SL-DRX is a bi-directional concept because, unlike a gNB in DRX, both nodes are intended to be OFF (duty-free) in this connection. The result is that when a UE in DRX mode suddenly has unicast data to the peer UE, it does not exit DRX mode. Instead, it can maintain "radio-off" until the next DRX cycle's "onDuration." But as DRX are symmetric in this example, wake up early does not help because the peer UE is (assumed) as "OFF."

Another difference is in terms of multiplicity. DRX "OFF" in one connection may not really put UE in OFF because UE has other "active" connections. When one UE has multiple SL connections to multiple UEs, the UE maintains multiple DRX mechanism/configurations (independently).

Figures 4, 5:
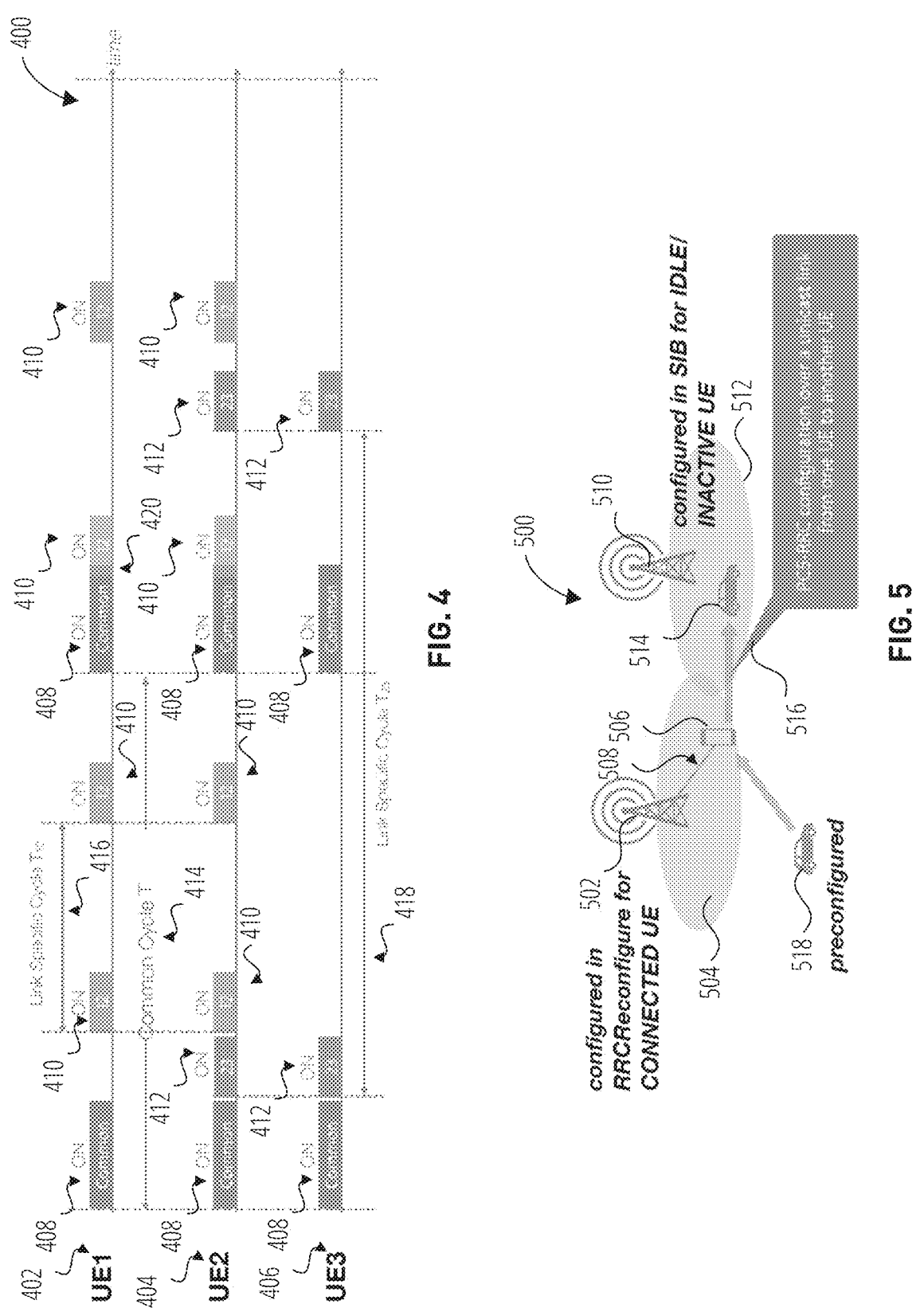
FIG. 4 is an annotated timing diagram, in accordance with one embodiment.
FIG. 5 is an annotated block diagram of a system for wireless communications, in accordance with one embodiment.

FIG. 4 is a timing diagram 400 of a first UE 402, a second UE 404, and third UE 406 implementing SL-DRX including a common DRX 408 and a first connection-specific DRX 410 between first UE 402 and second UE 404 and a second connection-specific DRX 412 between second UE 404 and third UE 406. This, each connection-specific DRX applies to a pair of UE and can be configured via PC5-RRC signaling.

Common DRX 408 is configured via Uu-RRC or pre-configuration and applies to every sidelink UE, cast-type agnostic. Common DRX 408 provides a default schedule in which all the UEs are known to be on and available to receive messages. For example, if first UE 402 is a vehicle traveling and at a certain speed and wants to indicate it is making a left turn to second UE 404 (e.g., a smartphone of a pedestrian), then common DRX 408 ensures second UE 404 is available to receive the message.

As noted previously, in some embodiments, connection-specific DRX (also called link-specific DRX) reuses the same parameters inactivity timer) configured for common DRX 408, e.g., if no specific timers are given. Each connection-specific SL-DRX is complementary to common SL-DRX.

On the example timing diagram 400, common cycle 414 has a longer duration than a link-specific cycle 416 but shorter than a link-specific cycle 418. An overlap 420 of an onDuration in common cycle 414 and link-specific cycle 416 (or a different link-specific cycle) is also contemplated.

FIG. 5 is an annotated block diagram 500 showing an overview of RRC configuration of a sidelink. A first gNB 502 providing a first coverage area 504 is in wireless communication with a first UE 506 to form a Uu interface 508 between first LIE 506 and first gNB 502. Accordingly, first UE 506 is in RRC Connected mode and may be configured for a sidelink through RRCReconfigure messages. A second gNB 510 provides a second coverage area 512. A second UE 514 is located in second coverage area 512, but is in Idle/Inactive mode. Nevertheless, it receives a common DRX configuration in in a system information block (SIB). PC5-link specific configuration is also provided between first UE 506 and second UE 514, which have already had a PC5-RRC connection 516. Finally, a third UE 518 is preconfigured.

Thus, in the example of FIG. 5, a common configuration can be configured to all sidelink UEs in-coverage or out of coverage. This provides a baseline to ensure a sidelink UE works even when no UEs are in RRC_CONNECTED state. PC5-link specific configuration is between the two UEs that have a PC5-RRC connection.

In one embodiment, an SL unicast DRX configuration includes several parameters for SL-DRX including starting offset, DRX cycle length (see e.g., T in FIG. 8), onDuration, and inactivityTimer. After inactivityTimer is ON, a UE tracks the data activity, and go back to OFF state if there is inactivity for a certain time. In other words, the UE tracks the activity of the link. For each link (unicast connections), DRX can be independently configured, and need not align with other link(s) or with common SL-DRX cycle. The flexibility is up to network (NW) configuration. For instance, the NW can allow arbitrary configurations or provide a limited number of choices as candidate SL-DRX configurations. For each configured parameter, if no link-specific parameter is provided, then the corresponding parameter for the common DRX configuration can be used as a default parameter. Also, in some embodiments, a switch between short and long DRX cycles is used for link-specific DRX, not for common DRX. After no activity in three short DRX cycles, the UE(s) can optionally engage in a long DRX cycle.

In another embodiment, an SL unicast DRX configuration for a bi-directional case when there is an existing PC5-RRC connection, with DRX configurations aligned for both UEs in SL unicast and negotiated via PC5-RRC procedures. When and whether to start DRX cycle is determined via PC5-RRC negotiation and mutually agreed by a master UE or by the peer UEs in equal roles. A tie among peers is broken according to a certain rule, such as lowest or highest network identification.

SL-DRX triggering can be independent of Uu RRC states (IDLE/INACTIVE/CONNECTED), and Uu interface may still be used for configuration. "Candidate" DRX configuration(s) may be included in SIB or pre-configuration. Rules may be provided to force UE to choose a specific DRX config (e.g., based on speed, density, RX pool size, etc.). Or, it is up to UE to decide which DRX configuration to choose. In summary, there are several options. First, for SL unicast, candidate DRX configurations are provided by gNB. Second, SL-DRX configuration rules are provided for UE to select, or it is up to UE to decide. Third, for the asymmetric case (one UE does not perform DRX), SL-DRX is determined by the power-saving UE and notify the peer UE via PC5-RRC or MAC CE signaling. Fourth, for the symmetric case, the SL-DRX configuration used by both peers are determined by a two-way handshake procedure (one UE proposes a configuration and the other UE accepts it).

In another embodiment, an SL unicast DRX configuration entails DL signaling. For example, in a first option, configuration is embedded in a SidelinkReconfigure PC5-RRC messages, which may contain more information than MAC-CE. PC5-RRC exchanges can be introduced for UEs to exchange each one's SL-DRX schedules. The schedule includes the UE DRX engagements in other links, and the common DRX cycle chosen. This can be done one-time (event-triggered) by piggybacked in SidelinkReconfigure messages, or this can also be done periodically. The second option is to introduce new MAC CE(s) to contain those parameters for SL-DRX configuration. Enable DRX cycles immediately, One UE can send this command to peer UE, so UEs will skip the "inactivity timer" tracking and enter the DRX mode to use DRX cycles. A failure message may be defined if the peer UE is unable to follow the SL-DRX configuration proposed.

Figure 6:
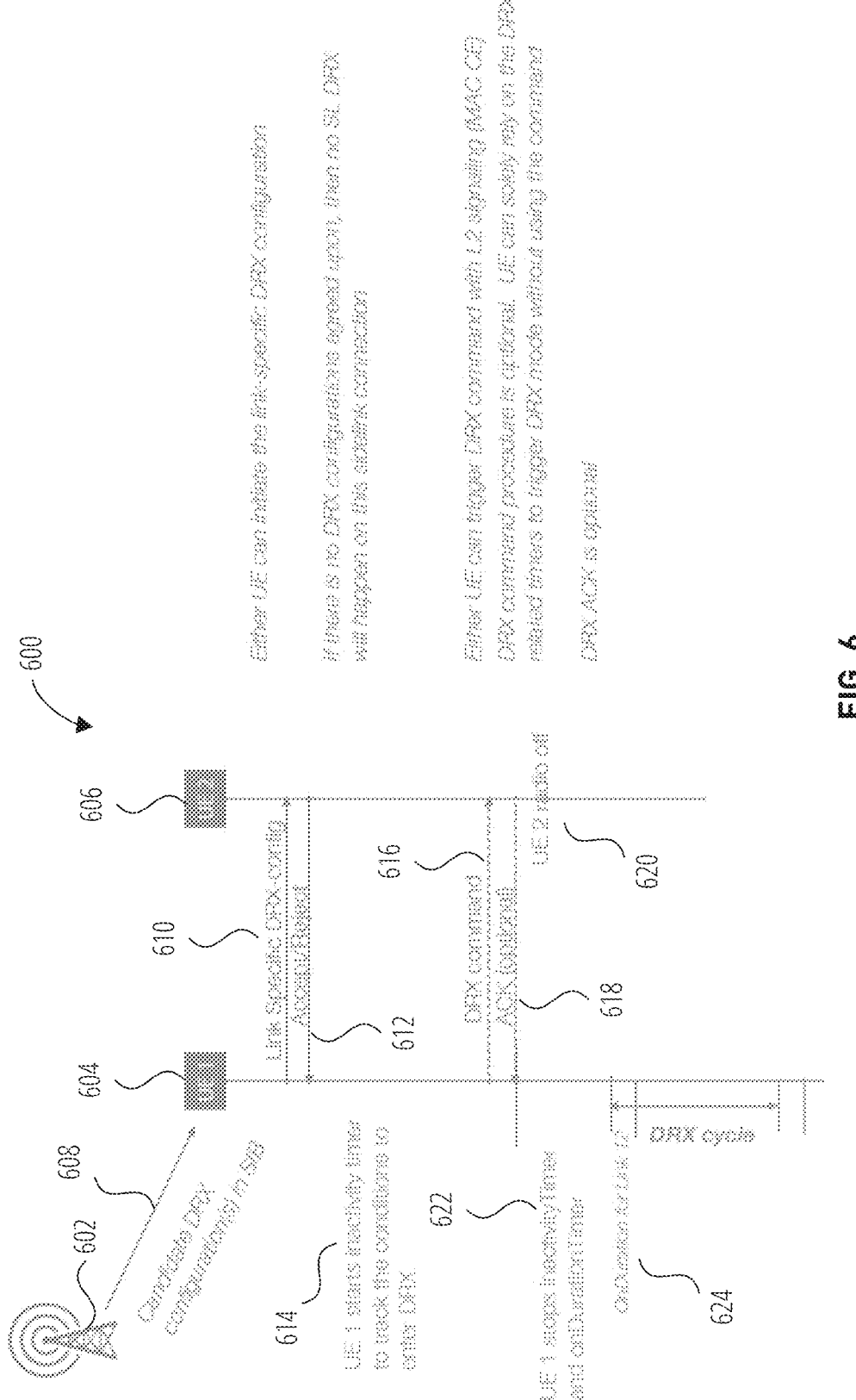
FIG. 6 is an annotated signal flow diagram, in accordance with one embodiment.

FIG. 6 is an annotated signal flow diagram 600 showing SL per-connection DRX to further explain the configurations explained above, with reference to a gNB 602, a first UE 604, and a second UE 606. Initially, candidate DRX configuration(s) in SIB 608 are provided to first UE 604. A link-specific DRX-config 610 is provided from first UE 604 to second UE 606, which second UE 606 may accept/reject 612, First UE 604 starts an inactivity tinier 614 to track the conditions to enter DRX. First UE 604 triggers a DRX command 616 to second UE 606. For instance, first UE 604 triggers DRX command 616 with L2 signaling (MAC CE). An optional ACK 618 (e.g., HARQ-ACK, L1) is provide from second UE 606 to first UE 604. Second UE 606 shuts its radio off 620. First UE 604 stops inactivity timer and onDuration timer 622. An onDuration for SL 624 is also shown in which there is a period of inactivity.

In other embodiments, DRX command 616 procedure is optional, in which case UEs rely on timers to trigger DRX mode.

Figure 7:
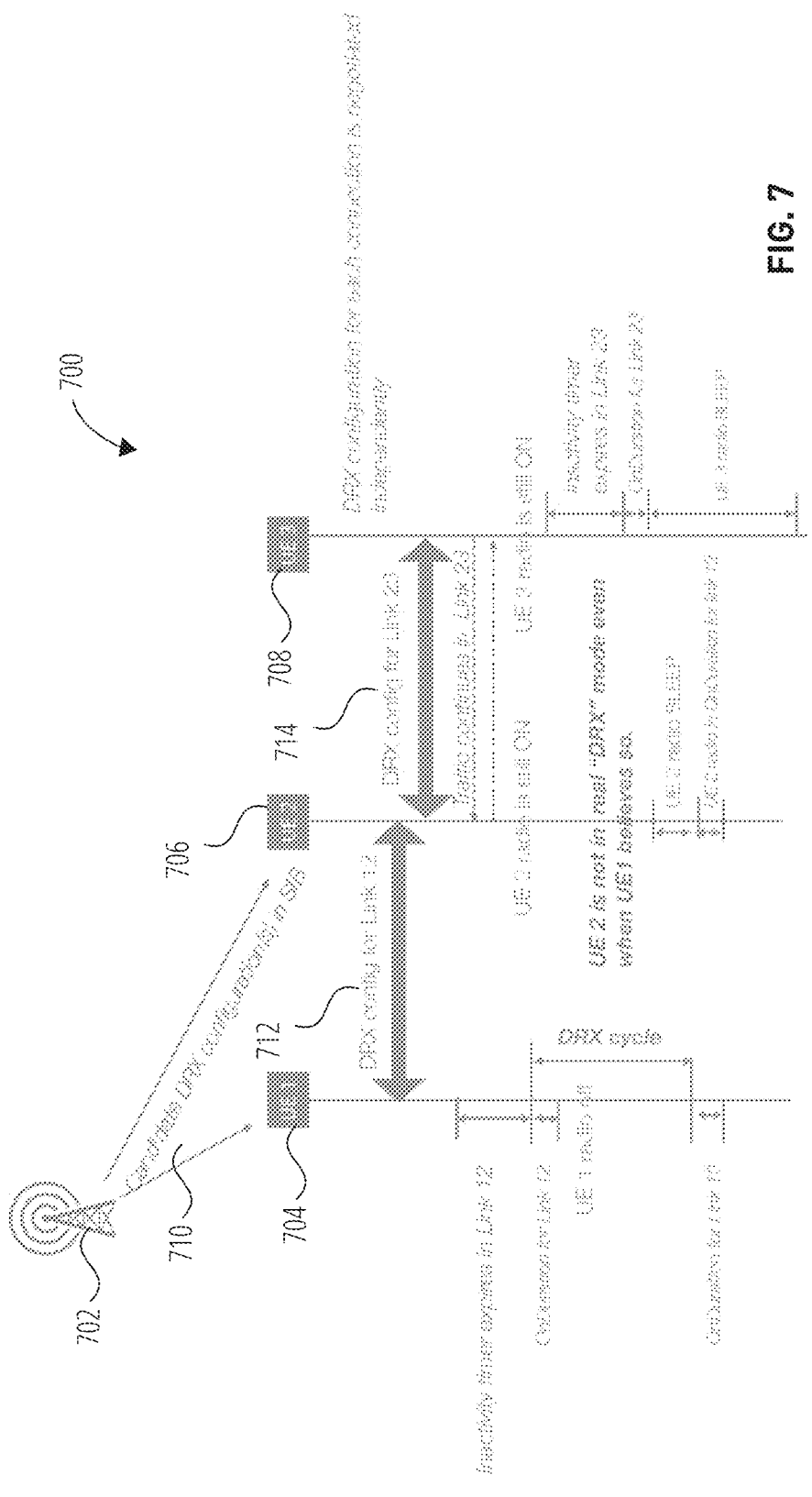
FIG. 7 is an annotated signal flow diagram, in accordance with one embodiment.
Figure 8:
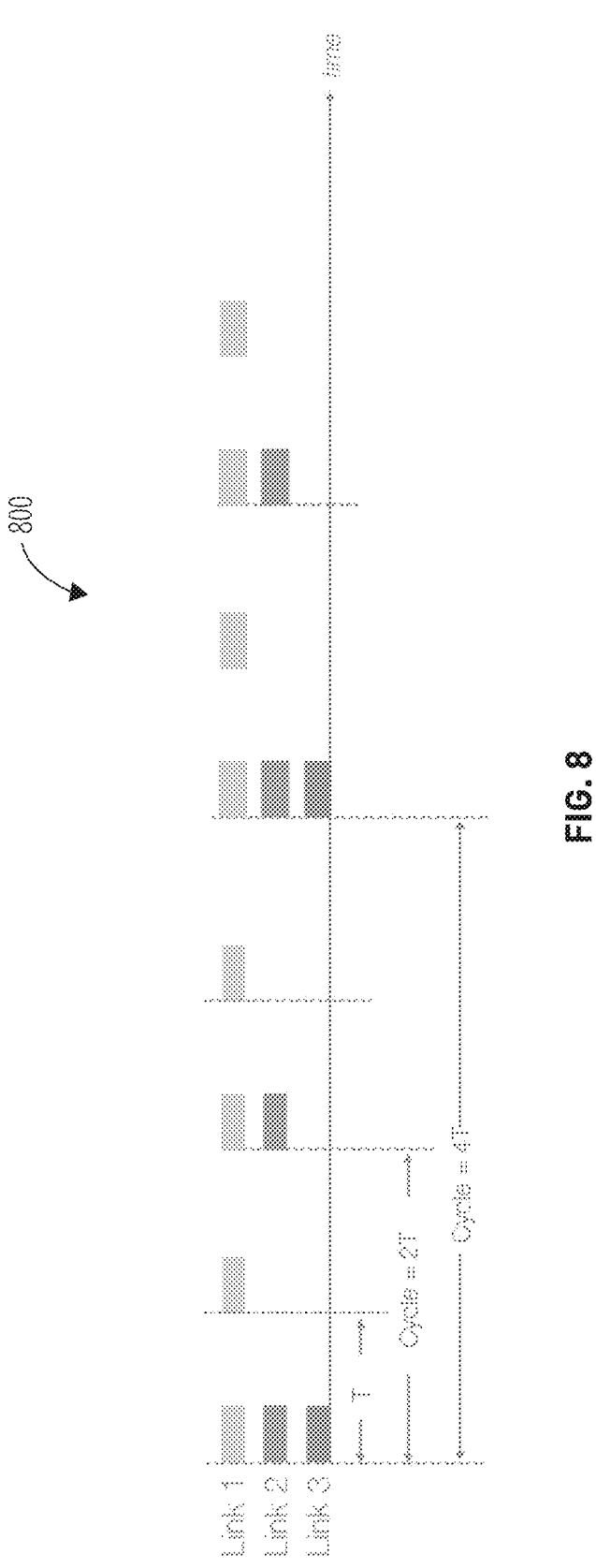
FIG. 8 is an annotated timing diagram, in accordance with one embodiment.

FIG. 7 is an annotated signal flow diagram 700 showing SL per-connection DRX to further explain the configurations explained above, with reference to a gNB 702, a first UE 704, a second UE 706, and a third UE 708. Initially, candidate DRX configuration(s) in SIB 710 are provided to first UE 704 and second LIE 706. A first link-specific DRX-config 712 is provided from first UE 704 to second UE 706, as described previously. In addition, a second link-specific DRX-config 714 is provided from second UE 706 to third UE 708. Thus, DRX configuration for each SL connection is negotiated independently. Furthermore, the first SL may be considered by first UE 704 to be in a DRX cycle, whereas a radio of second UE 706 remains active for the SL traffic with third UEs 708, FIG. 8 is a timing diagrams 800 for SL unicast. Initially, it is noted that if a UE has a PC5 link to one peer, the Uu C-DRX design may be readily duplicated for PC5. But as a sidelink UE may have multiple connections, it has to track inactivity in multiple links, so the super set of "inactivity+onDuration" in each of the connection will consume most of a busy UE's timeline. As a result, a UE may not get much power saving benefits of the SL DRX, Thus, if a UE has multiple peers, some additional design considerations are contemplated to achieve power savings.

In one embodiment, the network may intentionally align the starting offset to maximize the overlapping of each onDuration and reduce the power consumptions. Furthermore, the DRX cycle length can be configured as [T, 2T, 4T . . . 2n*T] sequence to enable overlapping onDuration. DRX cycle length, as indicated by T in FIG. 8 is the time between two adjacent onDuration periods. The configuration of this parameter determines how long a UE can sleep before it has to wake up again for listening on PSCCH channel.

Figure 9:
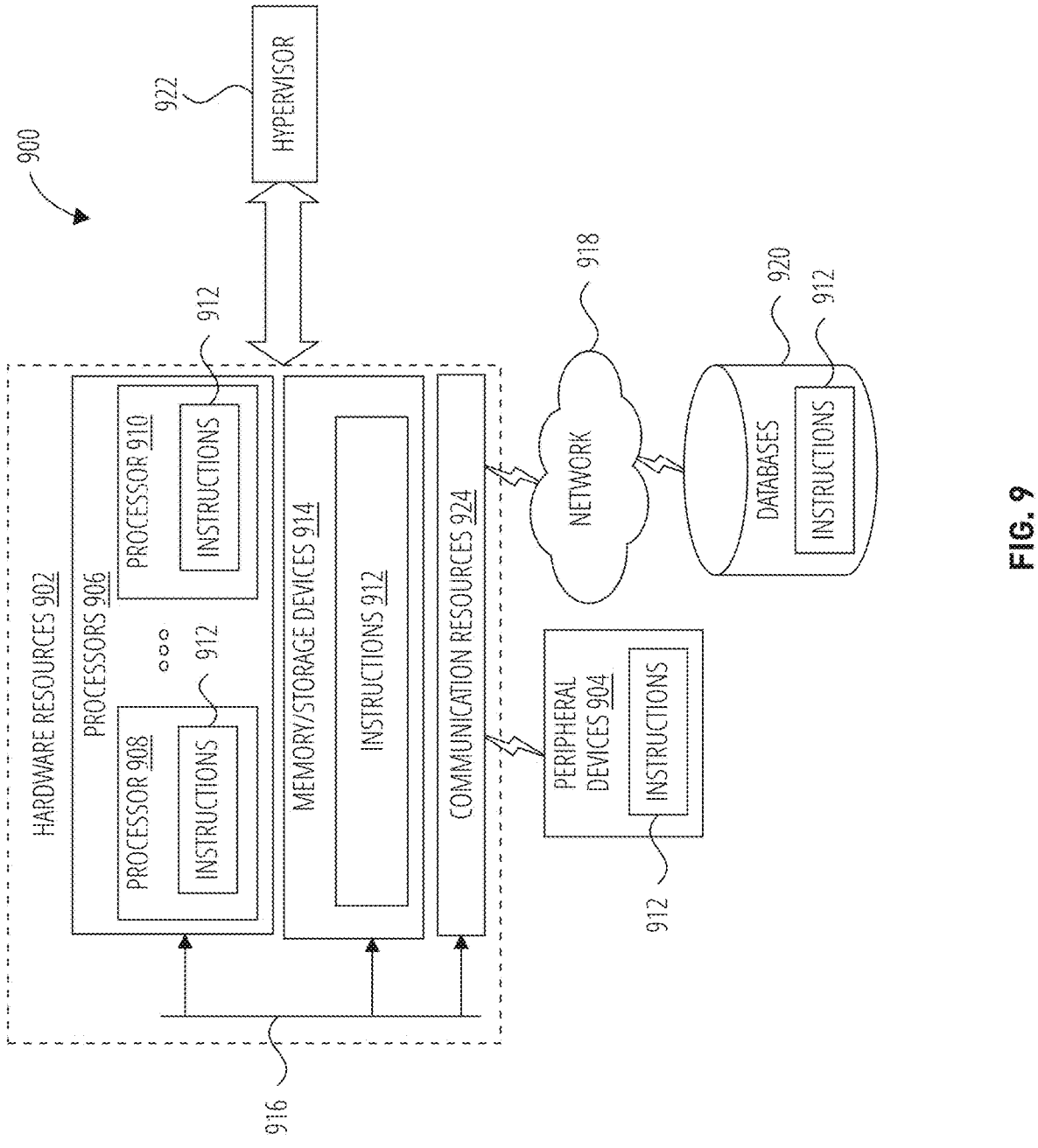
FIG. 9 is a block diagram, according to one embodiment.

FIG. 9 is a block diagram illustrating components 900, according to some example embodiments, able to read instructions from a machine-readable or computer-readable medium (e.g., a non-transitory machine-readable storage medium) and perform any one or more of the methodologies discussed herein. Specifically, FIG. 9 shows a diagrammatic representation of hardware resources 902 including one or more processors 906 (or processor cores), one or more memory/storage devices 914, and one or more communication resources 924, each of which may be communicatively coupled via a bus 916. For embodiments where node virtualization (e.g., NFV) is utilized, a hypervisor 922 may be executed to provide an execution environment for one or more network slices/sub-slices to utilize the hardware resources 902.

The processors 906 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 908 and a processor 910.

The memory/storage devices 914 may include main memory, disk storage, or any suitable combination thereof. The memory/storage devices 914 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 924 may include interconnection or network interface components or other suitable devices to communicate with one or more peripheral devices 904 or one or more databases 920 via a network 918. For example, the communication resources 924 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 912 may comprise software, a program, an application, an applet, an app, or other executable code for causing at least any of the processors 906 to perform any one or more of the methodologies discussed herein. The instructions 912 may reside, completely or partially, within at least one of the processors 906 (e.g., within the processor's cache memory), the memory/storage devices 914, or any suitable combination thereof. Furthermore, any portion of the instructions 912 may be transferred to the hardware resources 902 from any combination of the peripheral devices 904 or the databases 920. Accordingly, the memory of the processors 906, the memory/storage devices 914, the peripheral devices 904, and the databases 920 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method, performed by a first user equipment (UE), of configuring link-specific discontinuous reception (DRX), the method comprising: processing a sidelink DRX configuration configured by a network; and signaling over a PC5 interface with a second UE, a link-specific DRX configuration for a link-specific DRX cycle, the link-specific DRX configuration including a link-specific on-duration parameter.

Example 2 is the method of Example 1, further comprising establishing between the first UE and the second UE a unicast communication link based on the link-specific DRX configuration.

Example 3 is the method of Example 2, in which the link-specific DRX configuration is applied for both the first UE and the second UE of the unicast communication link.

Example 4 is the method of Example 1, in which signaling comprises a PC5-RRC message.

Example 5 is the method of Example 1, in which signaling comprises sidelink DRX MAC control element layer 2 signaling.

Example 6 is the method of Example 1, further comprising receiving the sidelink DRX configuration through Uu-RRC signaling.

Example 7 is the method of Example 1, further comprising receiving in a system information block (SIB) the sidelink DRX configuration as a cell-specific sidelink DRX configuration.

Example 8 is the method of Example 1, further comprising retrieving the sidelink DRX configuration that is pre-configured when the first UE is not in network coverage or unable to retrieve the sidelink DRX configuration via a serving base station.

Example 9 is the method of Example 1, further comprising switching between short and long link-specific sidelink DRX cycles.

Example 10 is the method of Example 1; in which the link-specific DRX configuration includes a link-specific DRX inactivity timer parameter.

Example 11 is the method of Example 10, in which the link-specific DRX inactivity timer parameter configures an inactivity timer of the first UE, the method further comprising checking, in response to expiration of the inactivity timer, data activity on a sidelink with the second UE to start the link-specific DRX cycle.

Example 12 is the method of Example 1; in which the PC5 interface is a first PC5 interface and the link-specific DRX configuration for a link-specific DRX cycle comprises a first link-specific DRX configuration for a first link-specific DRX cycle, the method further comprising signaling over a second PC5 interface with a third UE, a second link-specific DRX configuration for a second link-specific DRX cycle.

Example 13 is the method of Example 1; further comprising starting the link-specific DRX cycle in response to MAC control element layer 2 triggering from another UE.

Example 14 is a method, performed by a first user equipment (UE), of operating sidelink DRX based on multiple different discontinuous reception (DRX) configurations: determining a common DRX configuration for sidelink groupcast and broadcast communication; and determining a link-specific DRX configuration for sidelink unicast communication with a second UE.

Example 15 is the method of Example 14, in which the common DRX configuration for sidelink groupcast and broadcast is commonly configured for all UEs involved in sidelink groupcast and broadcast communication in proximity to each other.

Example 16 is the method of Example 14, in which the first UE when determining the link-specific DRX configuration, chooses a configuration to maximize overlapping time between onDuration periods of link-specific DRX and common DRX cycles.

Example 17 is the method of Example 14, further comprising adopting a parameter of the common DRX configuration for re-use in configuration of the sidelink unicast communication with a second UE.

Example 18 is the method of Example 17, in which the parameter is an inactivity parameter.

Example 19 is a non-transitory computer-readable storage medium, the computer-readable storage medium including instructions that when executed by a first user equipment (UE) for configuring link-specific discontinuous reception (DRX), cause the UE to: process a sidelink DRX configuration configured by a network; and signal over a PC5 interface with a second UE, a link-specific DRX configuration for a link-specific DRX cycle, the link-specific DRX configuration including a link-specific on-duration parameter.

Example 20 is the computer-readable storage medium of Example 19, in which the instructions further configure the UE to establish between the first UE and the second UE a unicast communication link based on the link-specific DRX configuration.

Example 21 is the computer-readable storage medium of Example 20, in which the link-specific DRX configuration is applied for both the first UE and the second LIE of the unicast communication link.

Example 22 is the computer-readable storage medium of Example 19, in which the signaling comprises a PC5-RRC message.

Example 23 is the computer-readable storage medium of Example 19, in which the signaling comprises sidelink DRX MAC control element layer 2 signaling.

Example 24 is the computer-readable storage medium of Example 19, in which the instructions further configure the UE to receive the sidelink DRX configuration through Uu-RRC signaling.

Example 25 is the computer-readable storage medium of Example 19, in which the instructions further configure the UE to receive in a system information block (SIB) the sidelink DRX configuration as a cell-specific sidelink DRX configuration.

Example 26 is the computer-readable storage medium of Example 19, in which the instructions further configure the UE to retrieve from the computer-readable storage medium the sidelink DRX configuration that is preconfigured when the first UE is not in network coverage or unable to retrieve the sidelink DRX configuration via a serving base station.

Example 27 is the computer-readable storage medium of Example 19, in which the instructions further configure the UE to switch between short and long link-specific sidelink DRX cycles.

Example 28 is the computer-readable storage medium of Example 19, in which the link-specific DRX configuration includes a link-specific DRX inactivity timer parameter.

Example 2.9 is the computer-readable storage medium of Example 28, in which the link-specific DRX inactivity timer parameter configures an inactivity timer of the first UE, the instructions further configure the UE to check, in response to expiration of the inactivity timer, data activity on a sidelink with the second UE to start the link-specific DRX cycle.

Example 30 is the computer-readable storage medium of Example 19, in which the PC5 interface is a first PC5 interface and the link-specific DRX configuration for a link-specific DRX cycle comprises a first link-specific DRX configuration for a first link-specific DRX cycle, the instructions further configure the UE to signal over a second PC5 interface with a third UE, a second link-specific DRX configuration for a second link-specific DRX cycle.

Example 31 is the computer-readable storage medium of Example 19, in which the instructions further configure the UE to start the link-specific DRX cycle in response to MAC control element layer 2 triggering from another UE.

Example 32 is a non-transitory computer-readable storage medium, the computer-readable storage medium including instructions that when executed by a first user equipment (UE) for operating sidelink DRX based on multiple different discontinuous reception (DRX) configurations, cause the UE to: determine a common DRX configuration for sidelink groupcast and broadcast communication; and determine a link-specific DRX configuration for sidelink unicast communication with a second UE.

Example 33 is the computer-readable storage medium of Example 32, in which the common DRX configuration for sidelink groupcast and broadcast is commonly configured for all UEs involved in sidelink groupcast and broadcast communication in proximity to each other.

Example 34 is the computer-readable storage medium of Example 32, in which the first UE when determine the link-specific DRX configuration, chooses a configuration to maximize overlapping time between onDuration periods of link-specific DRX and common DRX cycles.

Example 35 is the computer-readable storage medium of Example 32, in which the instructions further configure the UE to adopt a parameter of the common DRX configuration for re-use in configuration of the sidelink unicast communication with a second UE.

Example 36 is the computer-readable storage medium of Example 35, in which the parameter is an inactivity parameter.

Example 37 may include an apparatus comprising means to perform one or more elements of a method described in or related to any of the above Examples, or any other method or process described herein.

Example 38 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 39 may include an apparatus comprising logic, modules, or circuitry to perform one or more elements of a method described in or related to any of the above Examples, or any other method or process described herein.

Example 40 may include a method, technique, or process as described in or related to any of the above Examples, or portions or parts thereof.

Example 41 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 42 may include a signal as described in or related to any of the above Examples, or portions or parts thereof.

Example 43 may include a datagram, packet, frame, segment, protocol data unit (PDU), or message as described in or related to any of the above Examples, or portions or parts thereof, or otherwise described in the present disclosure.

Example 44 may include a signal encoded with data as described in or related to any of the above Examples, or portions or parts thereof, or otherwise described in the present disclosure.

Example 45 may include a signal encoded with a datagram, packet, frame, segment, PDU, or message as described in or related to any of the above Examples, or portions or parts thereof, or otherwise described in the present disclosure.

Example 46 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 47 may include a computer program comprising instructions, wherein execution of the program by a processing element is to cause the processing element to carry out the method, techniques, or process as described in or related to any of the above Examples, or portions thereof.

Example 48 may include a signal in a wireless network as shown and described herein.

Example 49 may include a method of communicating in a wireless network as shown and described herein.

Example 50 may include a system for providing wireless communication as shown and described herein.

Example 51 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method, performed by a first user equipment (UE), of configuring link-specific discontinuous reception (DRX), the method comprising:
   receiving in a system information block (SIB) a sidelink DRX configuration as a cell-specific sidelink DRX configuration;
   processing the sidelink DRX configuration configured by a network, the sidelink DRX configuration comprising a first on-duration parameter;
   signaling over a PC5 interface with a second UE, a link-specific DRX configuration for a link-specific DRX cycle, the link-specific DRX configuration including a link-specific on-duration parameter,
   wherein sidelink active time of the first UE includes time corresponding to the first on-duration parameter and the link-specific on-duration parameter; and
   starting the link-specific DRX cycle in response to MAC control element layer 2 triggering from another UE.

2. The method of claim 1, further comprising establishing between the first UE and the second UE a unicast communication link based on the link-specific DRX configuration.

3. The method of claim 2, in which the link-specific DRX configuration is applied for both the first UE and the second UE of the unicast communication link.

4. The method of claim 1, in which the signaling comprises a PC5-RRC message.

5. The method of claim 1, in which the signaling comprises sidelink DRX MAC control element layer 2 signaling.

6. The method of claim 1, further comprising receiving the sidelink DRX configuration through Uu-RRC signaling.

7. The method of claim 1, further comprising retrieving the sidelink DRX configuration that is preconfigured when the first UE is not in network coverage or unable to retrieve the sidelink DRX configuration via a serving base station.

8. The method of claim 1, further comprising switching between short and long link-specific sidelink DRX cycles.

9. The method of claim 1, in which the link-specific DRX configuration includes a link-specific DRX inactivity timer parameter.

10. The method of claim 9, in which the link-specific DRX inactivity timer parameter configures an inactivity timer of the first UE, the method further comprising checking, in response to expiration of the inactivity timer, data activity on a sidelink with the second UE to start the link-specific DRX cycle.

11. The method of claim 1, in which the PC5 interface is a first PC5 interface and the link-specific DRX configuration for a link-specific DRX cycle comprises a first link-specific DRX configuration for a first link-specific DRX cycle, the method further comprising signaling over a second PC5 interface with a third UE, a second link-specific DRX configuration for a second link-specific DRX cycle.

12. A method, performed by a first user equipment (UE), of operating sidelink DRX based on multiple different discontinuous reception (DRX) configurations:

determining a common DRX configuration for sidelink groupcast and broadcast communication configured by a network, the common DRX configuration comprising a first on-duration parameter, wherein the common DRX configuration is a cell-specific sidelink DRX configuration;

determining a link-specific DRX configuration for sidelink unicast communication with a second UE, the link-specific DRX configuration comprising a second on-duration parameter, wherein sidelink active time of the first UE includes time corresponding to the first on-duration parameter and the second on-duration parameter; and starting the link-specific DRX cycle in response to MAC control element layer 2 triggering from another UE.

13. The method of claim 12, in which the common DRX configuration for sidelink groupcast and broadcast is commonly configured for all UEs involved in sidelink groupcast and broadcast communication in proximity to each other.

14. The method of claim 12, in which the first UE when determining the link-specific DRX configuration, chooses a configuration to maximize overlapping time between onDuration periods of link-specific DRX and common DRX cycles.

15. The method of claim 12, further comprising adopting a parameter of the common DRX configuration for re-use in configuration of the sidelink unicast communication with a second UE.

16. The method of claim 15, in which the parameter is an inactivity parameter.

17. A non-transitory computer-readable storage medium, the computer-readable storage medium including instructions that when executed by a first user equipment (UE) for configuring link-specific discontinuous reception (DRX), cause the UE to:

receiving in a system information block (SIB) a sidelink DRX configuration as a cell-specific sidelink DRX configuration;

process the sidelink DRX configuration configured by a network, the sidelink DRX configuration comprising a first on-duration parameter;

signal over a PC5 interface with a second UE, a link-specific DRX configuration for a link-specific DRX cycle, the link-specific DRX configuration including a link-specific on-duration parameter, wherein sidelink active time of the first UE includes time corresponding to the first on-duration parameter and the link-specific on-duration parameter; and start the link-specific DRX cycle in response to MAC control element layer 2 triggering from another UE.

18. The computer-readable storage medium of claim 17, in which the instructions further configure the UE to establish between the first UE and the second UE a unicast communication link based on the link-specific DRX configuration.

* * * * *